(12) United States Patent
Watts et al.

(10) Patent No.: US 11,963,085 B2
(45) Date of Patent: Apr. 16, 2024

(54) SYSTEMS AND METHODS FOR DETERMINING ROUTING DATA BASED ON EXPLICIT CONGESTION NOTIFICATIONS AND ACTIVE QUEUE MANAGEMENT ENABLED NETWORK DEVICES

(71) Applicant: Verizon Patent and Licensing Inc., Basking Ridge, NJ (US)

(72) Inventors: Mark T. Watts, Newport, RI (US); Donna L. Polehn, Mercer Island, WA (US); David Taft, Keller, TX (US); Gregory Pultorak, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 17/502,723

(22) Filed: Oct. 15, 2021

(65) Prior Publication Data

US 2023/0118915 A1  Apr. 20, 2023

(51) Int. Cl.
*H04W 40/12* (2009.01)
*H04W 28/02* (2009.01)
*H04W 40/30* (2009.01)

(52) U.S. Cl.
CPC ..... *H04W 40/125* (2013.01); *H04W 28/0284* (2013.01); *H04W 40/30* (2013.01)

(58) Field of Classification Search
CPC ........... H04W 40/125; H04W 28/0284; H04W 40/30; H04L 47/11; H04L 2012/6443
See application file for complete search history.

(56) References Cited

U.S. PATENT DOCUMENTS

| | | | |
|---|---|---|---|
| 9,548,930 B1 * | 1/2017 | Hardie | ............... H04L 47/11 |
| 2020/0259746 A1 * | 8/2020 | Thubert | ............ H04L 45/28 |
| 2021/0385150 A1 * | 12/2021 | Shrivastava | ....... H04L 45/34 |

* cited by examiner

*Primary Examiner* — Omer S Mian

(57) ABSTRACT

A device may receive explicit congestion notification data associated with user devices connected to a network of network devices, and may receive network data identifying network metrics associated with the network devices. The device may generate an active queue management mapping table based on utilizing a model to process the explicit congestion notification data and the network data. The device may determine, based on the active queue management mapping table and the network data, a routing table that includes routing data identifying traffic paths with active queue management enabled network devices and without non-active queue management enabled network devices of the network devices. The device may provide the routing table to the network devices.

20 Claims, 9 Drawing Sheets

SYSTEMS AND METHODS FOR DETERMINING ROUTING DATA BASED ON EXPLICIT CONGESTION NOTIFICATIONS AND ACTIVE QUEUE MANAGEMENT ENABLED NETWORK DEVICES

BACKGROUND

In a network device (e.g., a base station, a router, a gateway, and/or the like), active queue management (AQM) may include a policy of dropping traffic (e.g., packets) inside a buffer associated with a network interface controller (MC) before that buffer becomes full, often with a goal of reducing network congestion or improving end-to-end latency.

DETAILED DESCRIPTION OF EXAMPLE EMBODIMENTS

Figure 1A:
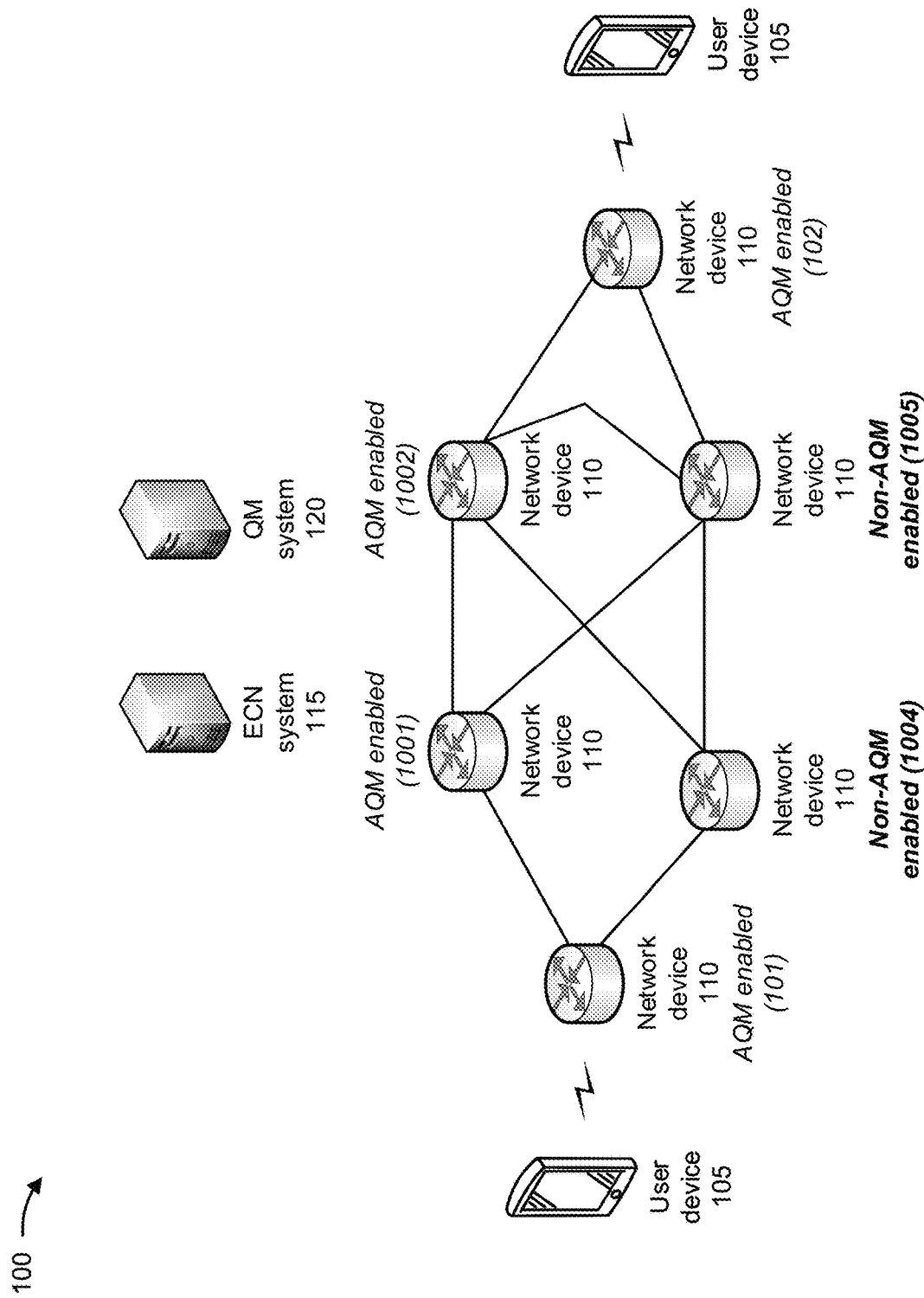
FIGS. 1A-1E are diagrams of an example associated with determining routing data based on explicit congestion notifications (ECNs) and active queue management (AQM) enabled network devices.

The following detailed description of example implementations refers to the accompanying drawings. The same reference numbers in different drawings may identify the same or similar elements.

A network device may include legacy queuing hardware or advanced queuing hardware. The network device with the legacy queuing hardware may not support active queue management (AQM) and may be referred to as a non-AQM enabled network device. The network device with the advanced queuing hardware may support AQM and may be referred to as an AQM enabled network device. Many networks include non-AQM enabled network devices and AQM enabled network devices, which creates a network patchwork problem for handling traffic. The AQM enabled network device may provide high-speed paths and low latency, whereas the non-AQM enabled network devices provide lower-speed paths and higher latency. However, current techniques for routing traffic through such heterogenous networks fail to identify the non-AQM enabled network devices and utilize suboptimal paths with non-AQM enabled network devices. Thus, current techniques for routing traffic through heterogenous networks consumes computing resources (e.g., processing resources, memory resources, communication resources, and/or the like), networking resources, and/or other resources associated with utilizing lower-speed paths with higher latency, creating traffic delays with the lower-speed paths, losing traffic due to the lower-speed paths, attempting to recover lost traffic, and/or the like.

Some implementations described herein provide a queue management (QM) system that determines routing data based on ECNs and AQM enabled network devices. For example, the QM system may receive ECN data associated with user devices connected to a network of network devices, and may receive network data identifying network metrics associated with the network devices. The QM system may generate an AQM mapping table based on utilizing a model to process the ECN data and the network data, and may determine, based on the AQM mapping table and the network data, a routing table that includes routing data identifying traffic paths with AQM enabled network devices and without non-AQM enabled network devices, of the network devices. The QM system may provide the routing table to the network devices.

In this way, the QM system determines routing data based on ECNs and AQM enabled network devices to provide low latency low loss scalable throughput (L4S) for networks using AQM. For example, the QM system may receive ECN data associated with user devices connected to a network of network devices, and may identify AQM enabled network devices of the network devices. The QM system may determine an AQM mapping table that maps the AQM enabled network devices to paths associated with the ECN data, and may determine, based on the AQM mapping table, a routing table identifying paths to prevent or minimize the ECN data. The QM system may provide the routing table to the network devices so that the ECN data may be prevented or minimized. Thus, implementations described herein may conserve computing resources, networking resources, and/or other resources that would have otherwise been consumed by utilizing lower-speed paths with higher latency, creating traffic delays with the lower-speed paths, losing traffic due to the lower-speed paths, attempting to recover lost traffic, and/or the like.

FIGS. 1A-1E are diagrams of an example 100 associated with determining routing data based on ECNs and AQM enabled network devices. As shown in FIGS. 1A-1E, example 100 includes user devices 105, a network of network devices 110, an ECN system 115, and a QM system 120. Further details of the user devices 105, the network devices 110, the ECN system 115, and the QM system 120 are provided elsewhere herein.

As shown in FIG. 1A, some of the network devices 110 may be AQM enabled network devices 110, such as the network device 110 with a network identifier (ID) of "101," the network device 110 with a network ID of "1001," the network device 110 with a network ID of "1002," and the network device 110 with a network ID of "102." The AQM enabled network devices 110 may include advanced queuing hardware that supports AQM. Some of the network devices 110 may not be AQM enabled, such as the network device 110 with a network ID of "1004" and the network device 110 with a network ID of "1005." The non-AQM enabled network devices 110 may include legacy queuing hardware that fails to support AQM. Thus, the network may be a heterogeneous network that includes one or more AQM enabled network devices 110 and one or more non-AQM enabled network devices 110.

As further shown in FIG. 1A, the network device 110 with the network ID of "101" may be associated with a first user device 105, and the network device 110 with the network ID of "102" may be associated with a second user device 105. The first user device 105 may receive traffic from and/or transmit traffic to the network device 110 with the network ID of "101." The second user device 105 may receive traffic from and/or transmit traffic to the network device 110 with the network ID of "102."

Figure 1B:
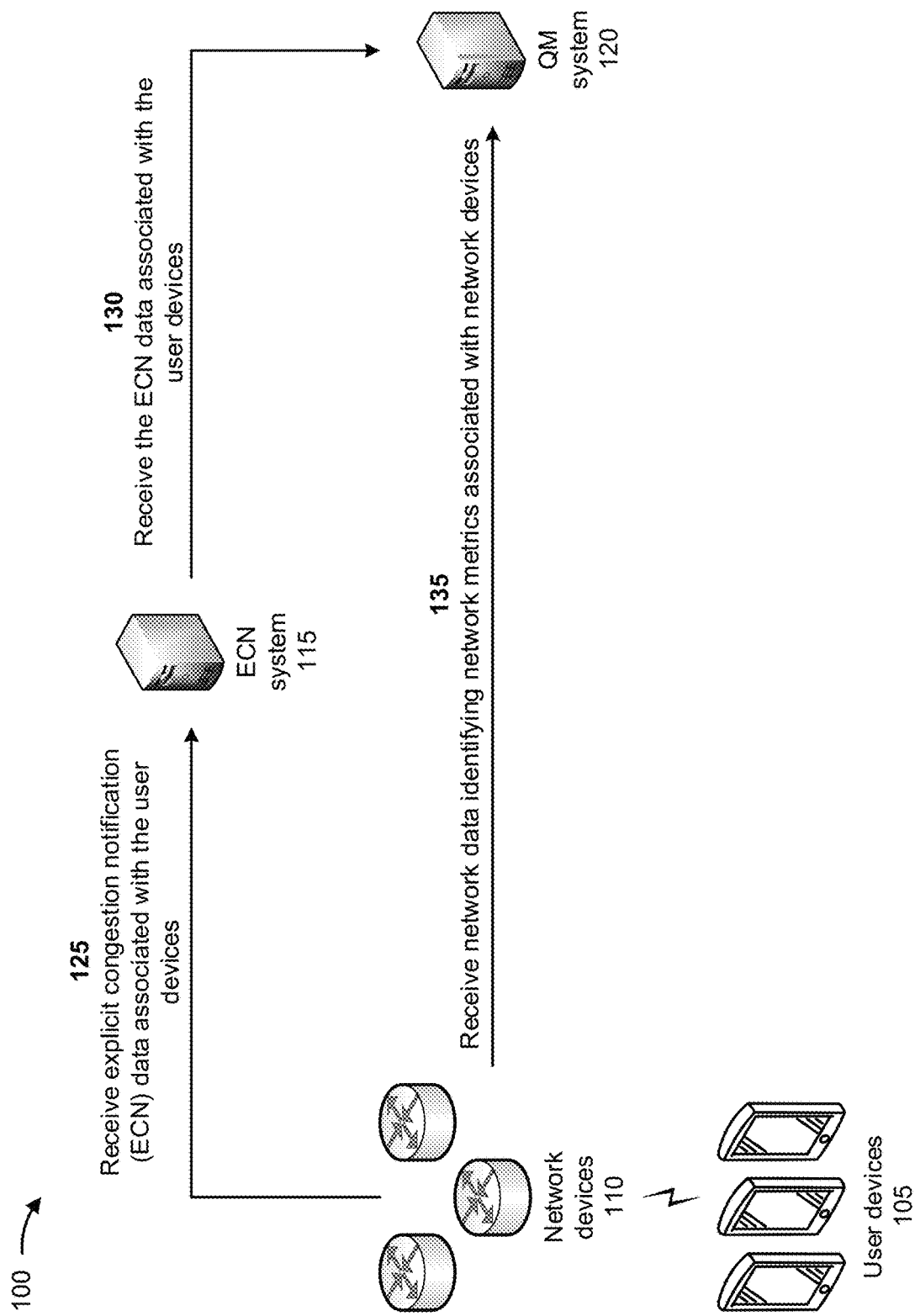

As shown in FIG. 1B, and by reference number 125, the ECN system 115 may receive, from the network devices 110, ECN data associated with the user devices 105. The ECN data may include data associated with an extension to an Internet protocol (IP) and a transmission control protocol (TCP). The ECN data may also be defined for other transport layer protocols that perform congestion control, such as a datagram congestion control protocol (DCCP) and a stream control transmission protocol (SCTP). It is also possible to use the ECN data with protocols layered above a user datagram protocol (UDP). More recent UDP-based protocols, such as the QUIC protocol, are using ECN for congestion control.

The ECN data may enable end-to-end notification of network congestion without dropping packets. The ECN data may be generated by one or more of the user devices 105 and/or by one or more of the network devices 110 (e.g., that are capable of generated ECN data). The ECN system 115 may receive the ECN data from the network devices 110 on a per flow basis, where each flow may include an ECN value that identifies explicit congestion associated with the flow (e.g., of one or more user devices 105). In some implementations, the network devices 110 may automatically provide the ECN data to the ECN system 115, may periodically provide the ECN data to the ECN system 115, may provide the ECN data to the ECN system 115 based on requests for the ECN data (e.g., generated by the ECN system 115), and/or the like.

As further shown in FIG. 1B, and by reference number 130, the QM system 120 may receive the ECN data associated with the user devices 105 from the ECN system 115. For example, the ECN system 115 may provide the ECN data to the QM system 120 as soon as the ECN system 115 receives the ECN data. In some implementations, the ECN system 115 may automatically provide the ECN data to the QM system 120, may periodically provide the ECN data to the QM system 120, may provide the ECN data to the QM system 120 based on requests for the ECN data (e.g., generated by the QM system 120), and/or the like. In some implementations, the QM system 120 may store the ECN data in a data structure associated with the QM system 120.

As further shown in FIG. 1B, and by reference number 135, the QM system 120 may receive, from the network devices 110, network data identifying network metrics associated with the network devices 110. The network metrics may include data identifying network IDs associated with the network devices 110 (e.g., network IDs of "101," "102," "1001," "1002," "1004," and "1005"), indications of whether each of the network devices 110 are AQM enabled or are non-AQM enabled, indications of whether the network devices 110 are associated with low latency communications (LLCs), indications of whether the network devices 110 are associated with enhanced mobile broadband (eMBB), service types associated with network traffic, and/or the like. In some implementations, the network devices 110 may automatically provide the network data to the QM system 120, may periodically provide the network data to the QM system 120, may provide the network data to the QM system 120 based on requests for the network data (e.g., generated by the QM system 120), may provide the network data to the ECN system 115 and the ECN system 115 may forward the network data to the QM system 120, and/or the like.

Figure 1C:
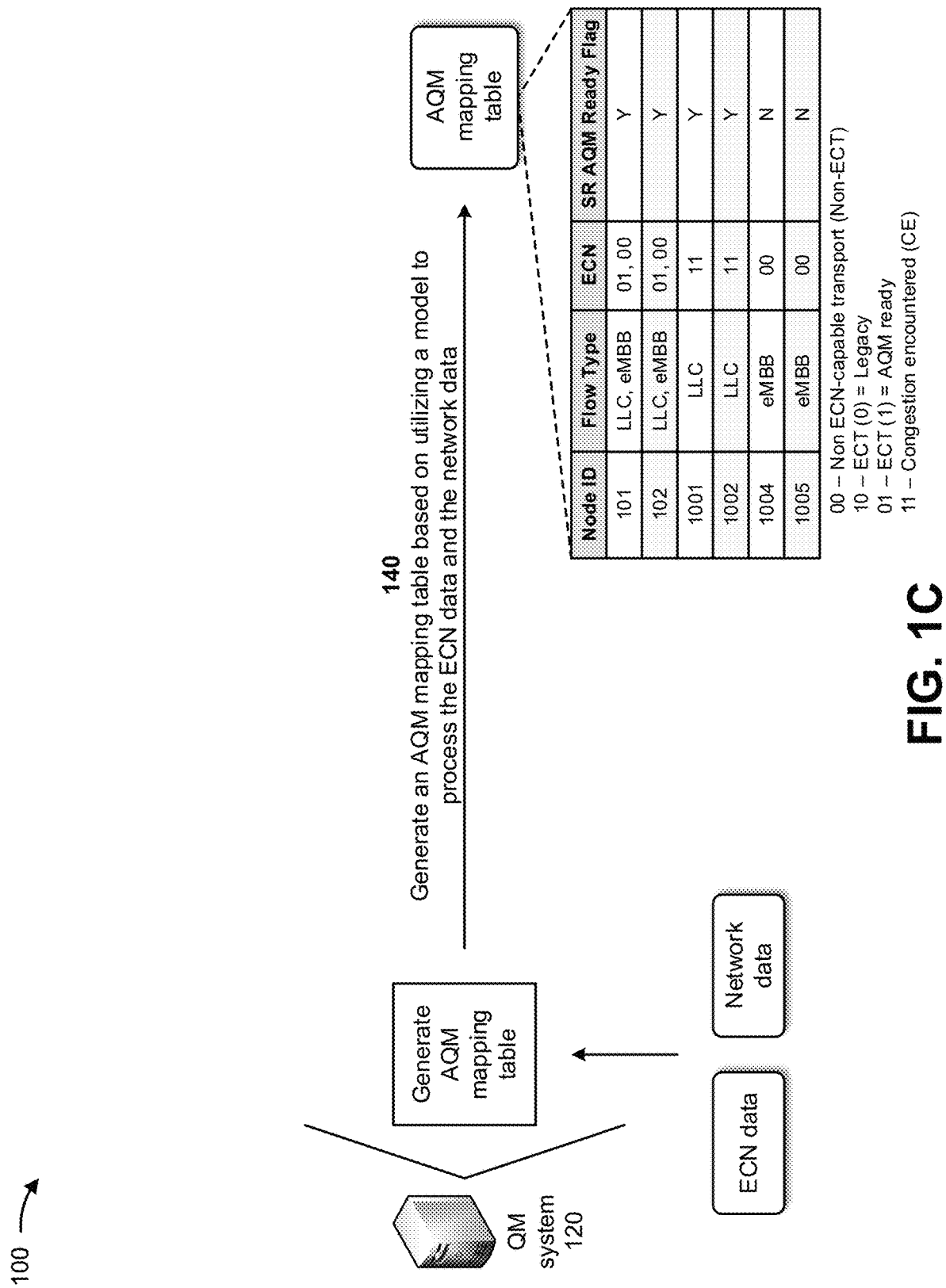

As shown in FIG. 1C, and by reference number 140, the QM system 120 may generate an AQM mapping table based on utilizing a model to process the ECN data and the network data. For example, when generating the AQM mapping table, the QM system 120 may process the ECN data and the network data, with the model, to generate the AQM mapping table. The model may include a static model or a machine learning model. The machine learning model may automatically adjust mapping criteria for generating the AQM mapping table based on overall congestion control criteria or specific congestion control criteria. Further details of the machine learning model are provided below in connection with FIG. 2.

In some implementations, when generating the AQM mapping table, the QM system may map identifiers associated with the network devices 110 (e.g., network IDs) and flow types associated with the ECN data, based on transports and congestion associated with the ECN data and based on whether each of the network devices 110 are AQM enabled or are non-AQM enabled, to generate the AQM mapping table. The mapping of the identifiers associated with the network devices 110 and the flow types associated with the ECN data may be dynamic (e.g., via the machine learning model) or static (e.g., via the static model) based on a per traffic path requirement, a per user device 105 requirement, or a flow requirement.

As further shown in FIG. 1C, the AQM mapping table may include data identifying identifiers associated with the network devices 110 (e.g., a network or node ID field), flow types associated with the ECN data (e.g., a flow type field), transports and congestion associated with the ECN data (e.g., an ECN field), indications of whether each of the network devices 110 are AQM enabled or are non-AQM enabled (e.g., a segment routing (SR) AQM ready flag field), and/or the like. The node ID field may include data identifying the network IDs associated with the network devices 110 (e.g., network IDs of "101," "102," "1001," "1002," "1004," and "1005"). The flow type field may include data indicating whether each of the network devices 110 identified in the node ID field is associated with LLCs, eMBB, and/or the like. The ECN field may include values indicating whether each of the network devices 110 identified in the node ID field is associated with a non ECN-capable transport (e.g., "00"), is a legacy non-AQM enabled network device 110 (e.g., "10"), is an AQM enabled network device 110 (e.g., "01"), is encountering congestion (e.g., "11"), and/or the like. Multiple values may be assigned to a flow or flows in the ECN field. The SR AQM ready flag field may include data indicating whether each of the network devices 110 identified in the node ID field is an AQM enabled network device 110 (e.g., "Y") or is a non-AQM enabled network device 110 (e.g., "N").

Figure 1D:
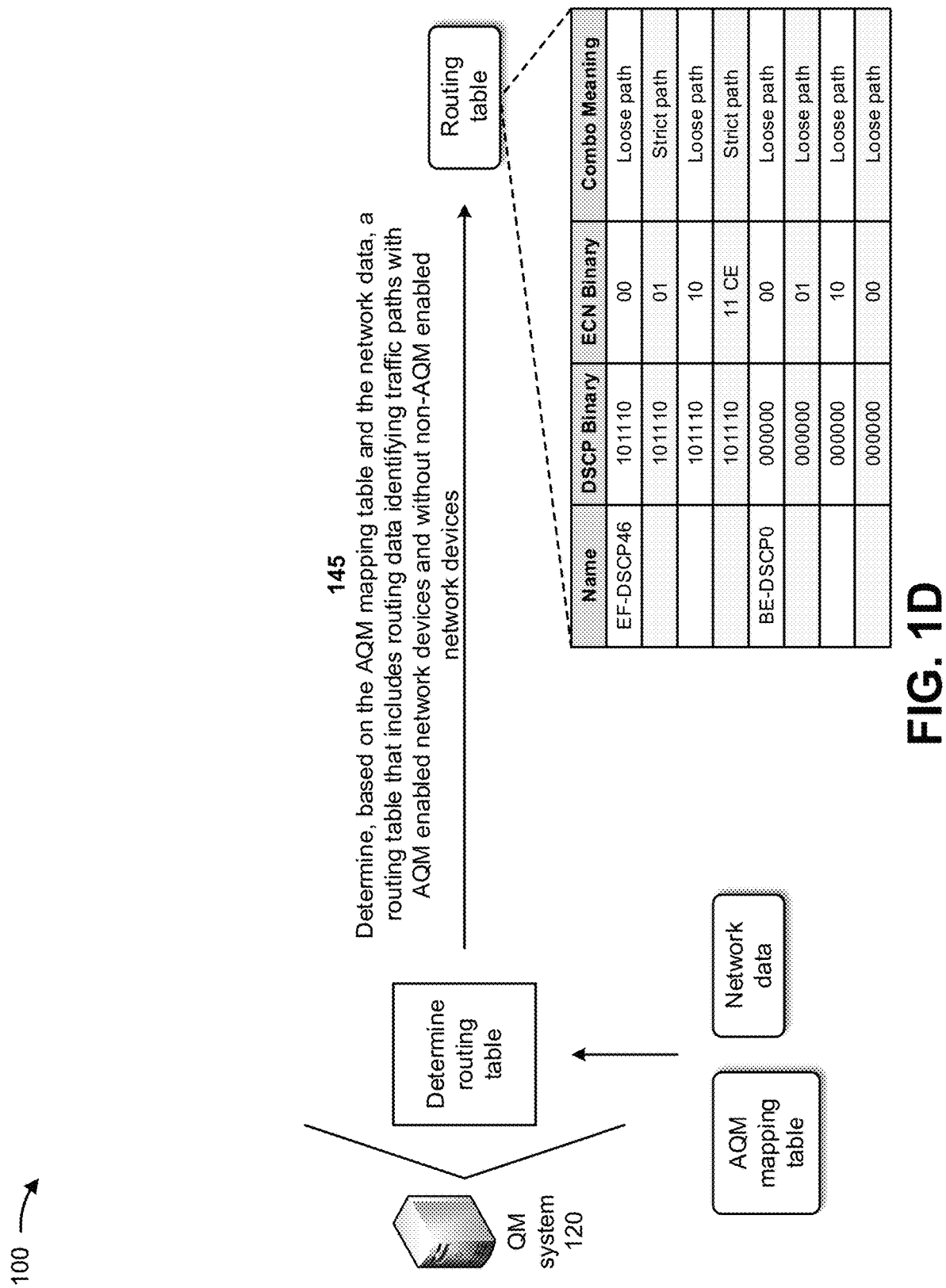

As shown in FIG. 1D, and by reference number 145, the QM system 120 may determine, based on the AQM mapping table and the network data, a routing table that includes routing data identifying traffic paths with AQM enabled network devices 110 and without non-AQM enabled network devices 110. For example, when determining, based on the AQM mapping table and the network data, the routing table, the QM system 120 may determine the routing table based on service types associated with network traffic identified in the network data, a quantity of AQM enabled network devices 110 of the network devices 110, a quantity of non-AQM enabled network devices 110 of the network devices 110, network changes identified in the network data, and/or the like.

In some implementations, when determining, based on the AQM mapping table and the network data, the routing table, the QM system 120 may map service types associated with network traffic, with differentiated service code point (DSCP) binary values associated with the service types and with ECN binary values associated with the service types, to determine the routing table. The service types and the DSCP binary values may be mapped based on overall congestion control criteria or specific congestion control criteria. Legacy network devices 110 (e.g., non-AQM enabled network devices 110) may be controlled using DSCP from adjacent upstream or downstream network devices 110 that are AQM enabled.

As further shown in FIG. 1D, the routing table may include data identifying service types associated with network traffic (e.g., a name field), DSCP binary values associated with the service types (e.g., a DSCP binary filed), ECN binary values associated with the service types (e.g., an ECN binary field), indications of whether each of the traffic paths include multiple paths or a single path (e.g., a combo meaning field), and/or the like. The name field may include data identifying service types, such as an expedited forwarding (EF) DSCP service type, a best effort (BE) DSCP service type, and/or the like. The DSCP binary field may include values identifying DSCP binaries associated with each of the service types identified in the name field, such as "101110," "000000," and/or the like. The ECN binary field may include values indicating whether each of the service types identified in the name field is associated with a non ECN-capable transport (e.g., "00"), is a legacy non-AQM enabled network device 110 (e.g., "10"), is an AQM enabled network device 110 (e.g., "01"), is encountering congestion (e.g., "11"), and/or the like. The combo meaning field may include information indicating whether each of the service types identified in the name field is associated with multiple paths (e.g., a loose path indicating that multiple different paths may be utilized), a single path (e.g., a strict path indicating that only the single path may be utilized), and/or the like.

Figure 1E:
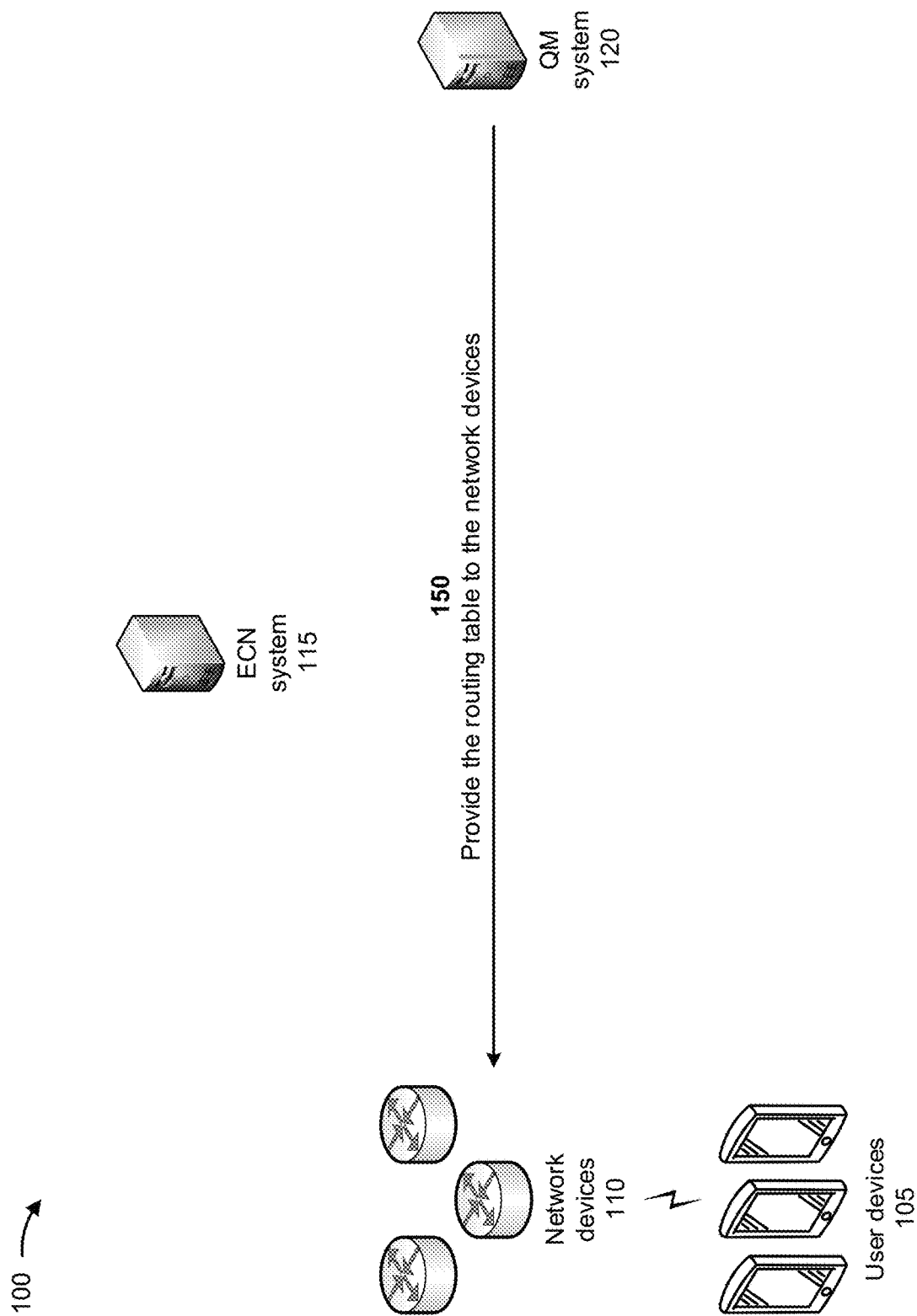

As shown in FIG. 1E, and by reference number 150, the QM system 120 may provide the routing table to the network devices 110. For example, the QM system 120 may provide the routing table to AQM enabled network devices 110 over a network interface, such as a software defined network interface, and may provide the routing table to non-AQM enabled network devices 110 via a DSCP mapping. In some implementations, the routing table may cause the network devices 110 to provide source-based Multiprotocol Label Switching (MPLS) routing, IP version 6 (IPv6) routing, IP version 4 (IPv4) routing, and/or the like. In some implementations, the routing table may cause the network devices 110 to provide segment routing (SR) for network traffic via the traffic paths. In some implementations, the routing data of the routing table may cause the network devices 110 to utilize traffic paths with AQM enabled network devices 110 and without non-AQM enabled network devices 110.

In this way, the QM system 120 determines routing data based on ECNs and AQM enabled network devices 110 to provide L4S for networks using AQM. For example, the QM system 120 may receive ECN data associated with the user devices 105 connected to a network of the network devices 110, and may identify AQM enabled network devices 110 of the network devices 110. The QM system 120 may determine an AQM mapping table that maps the AQM enabled network devices 110 to paths associated with the ECN data, and may determine, based on the AQM mapping table, a routing table identifying paths to prevent or minimize the ECN data. The QM system 120 may provide the routing table to the network devices 110 so that the ECN data may be prevented or minimized. Thus, implementations described herein may conserve computing resources, networking resources, and/or other resources that would have otherwise been consumed by utilizing lower-speed paths with higher latency, creating traffic delays with the lower-speed paths, losing traffic due to the lower-speed paths, attempting to recover lost traffic, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
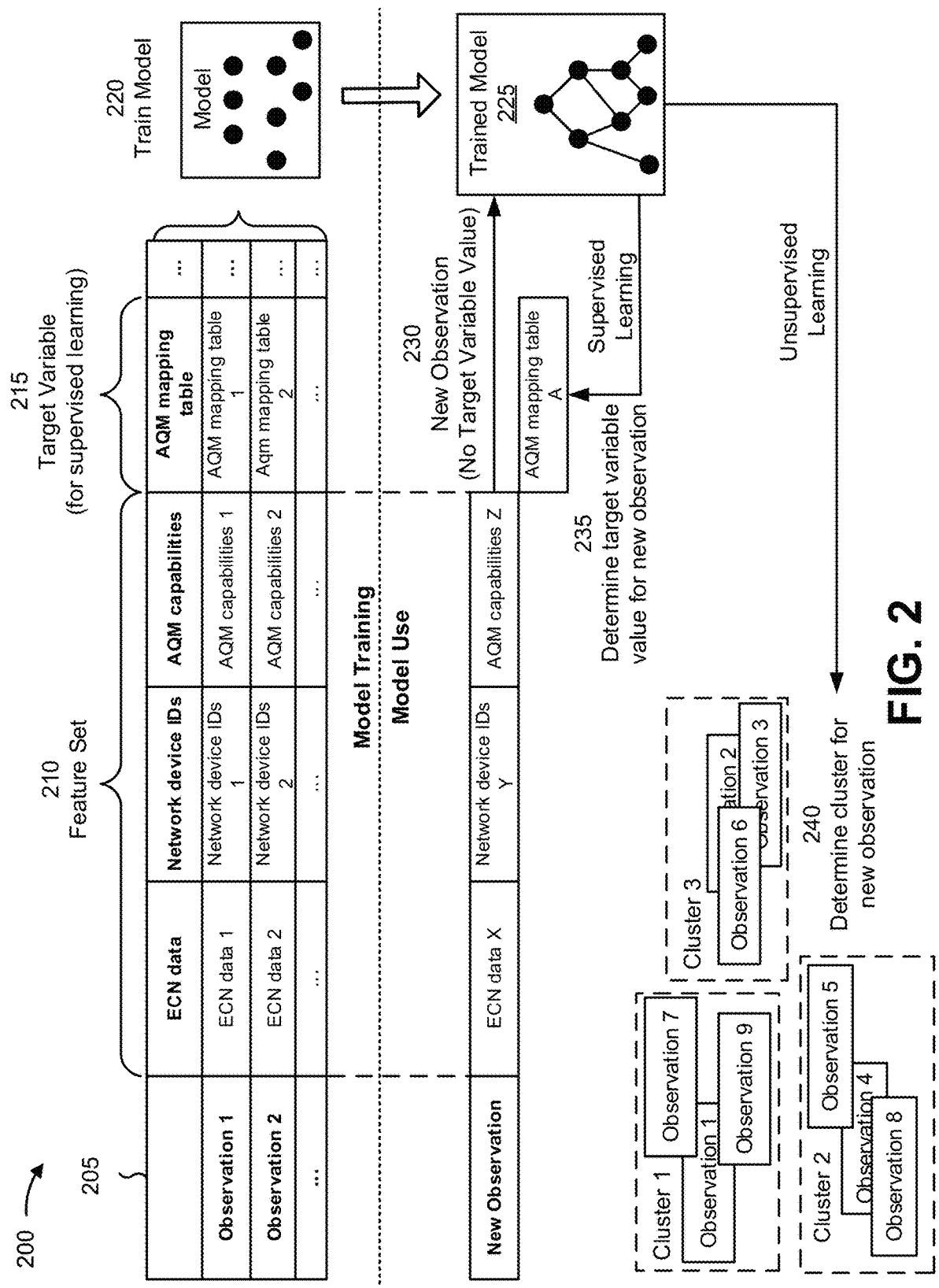
FIG. 2 is a diagram illustrating an example of training and using a machine learning model in connection with determining an AQM mapping table based on ECN data and network data.

FIG. 2 is a diagram illustrating an example 200 of training and using a machine learning model in connection with determining an AQM mapping table based on ECN data and network data. The machine learning model training and usage described herein may be performed using a machine learning system. The machine learning system may include or may be included in a computing device, a server, a cloud computing environment, and/or the like, such as the QM system 120 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the QM system 120, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the QM system 120. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of ECN data, a second feature of network device IDs, a third feature of AQM capabilities, and so on. As shown, for a first observation, the first feature may have a value of ECN data 1, the second feature may have a value of network device IDs 1, the third feature may have a value of AQM capabilities 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is an AQM mapping table, which has a value of AQM mapping table 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of ECN data X, a second feature of network device IDs Y, a third feature of AQM capabilities Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of AQM mapping table A for the target variable of the AQM mapping table for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an ECN data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a network device IDs cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine an AQM mapping table based on ECN data and network data. The machine learning system enables recognition and/or identification of tens, hundreds, thousands, or millions of features and/or feature values for tens, hundreds, thousands, or millions of observations, thereby increasing accuracy and consistency and reducing delay associated with determining an AQM mapping table based on ECN data and network data relative to requiring computing resources to be allocated for tens, hundreds, or thousands of operators to manually determine an AQM mapping table based on ECN data and network data.

As indicated above, FIG. 2 is provided as an example. Other examples may differ from what is described in connection with FIG. 2.

Figure 3:
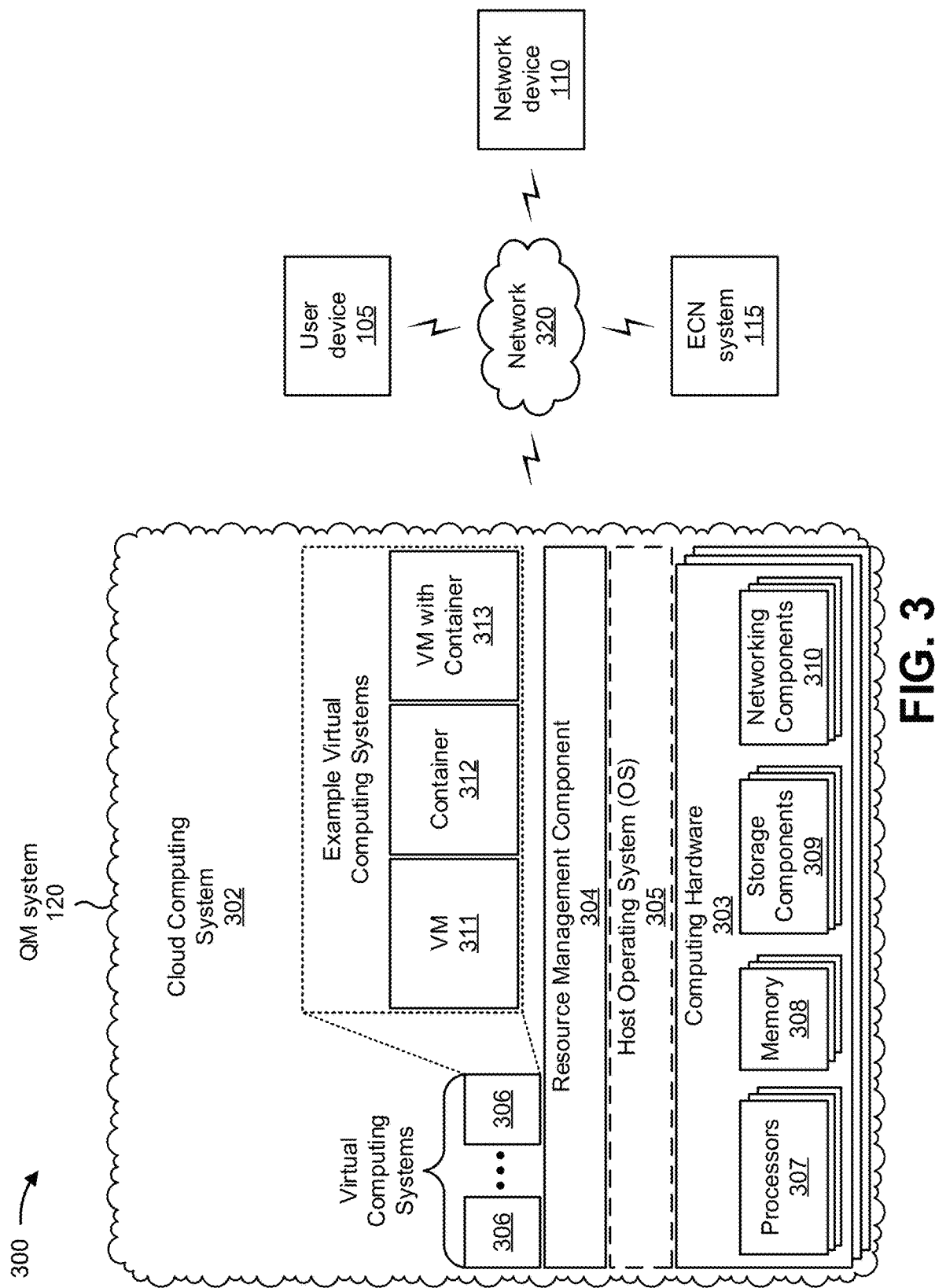
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the QM system 120, which may include one or more elements of and/or may execute within a cloud computing system 302. The cloud computing system 302 may include one or more elements 303-313, as described in more detail below. As further shown in FIG. 3, environment 300 may include the user device 105, the network device 110, the ECN system 115, and/or a network 320. Devices and/or elements of environment 300 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a server device, an application server, a wired or wireless end device, or a similar type of device.

The network device 110 includes one or more devices capable of receiving, processing, storing, routing, and/or providing traffic (e.g., a packet and/or other information or metadata) in a manner described herein. For example, the network device 110 may include a router, such as a label switching router (LSR), a label edge router (LER), an ingress router, an egress router, a provider router (e.g., a provider edge router or a provider core router), a virtual router, or another type of router. Additionally, or alternatively, the network device 110 may include a gateway, a switch, a firewall, a hub, a bridge, a reverse proxy, a server (e.g., a proxy server, a cloud server, or a data center server), a load balancer, a base station (e.g., a gNodeB, an eNodeB, and/or the like), and/or a similar device. In some implementations, the network device 110 may be a physical device implemented within a housing, such as a chassis. In some implementations, the network device 110 may be a virtual device implemented by one or more computing devices of a cloud computing environment or a data center. In some implementations, a group of network devices 110 may be a group of data center nodes that are used to route traffic flow through a network.

The ECN system 115 includes one or more devices capable of receiving, generating, storing, processing, providing, and/or routing information, as described elsewhere herein. The ECN system 115 may include a communication device and/or a computing device. For example, the ECN system 115 may include a server, such as an application server, a client server, a web server, a database server, a host server, a proxy server, a virtual server (e.g., executing on computing hardware), or a server in a cloud computing system. In some implementations, the ECN system 115 includes computing hardware used in a cloud computing environment.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Google Cloud platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the QM system 120 may include one or more elements 303-313 of the cloud computing system 302, may execute within the cloud computing system 302, and/or may be hosted within the cloud computing system 302, in some implementations, the QM system 120 may not be cloud-based (e.g., may be implemented outside of a cloud computing system) or may be partially cloud-based. For example, the QM system 120 may include one or more devices that are not part of the cloud computing system 302, such as the device 400 of FIG. 4, which may include a standalone server or another type of computing device. The QM system 120 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
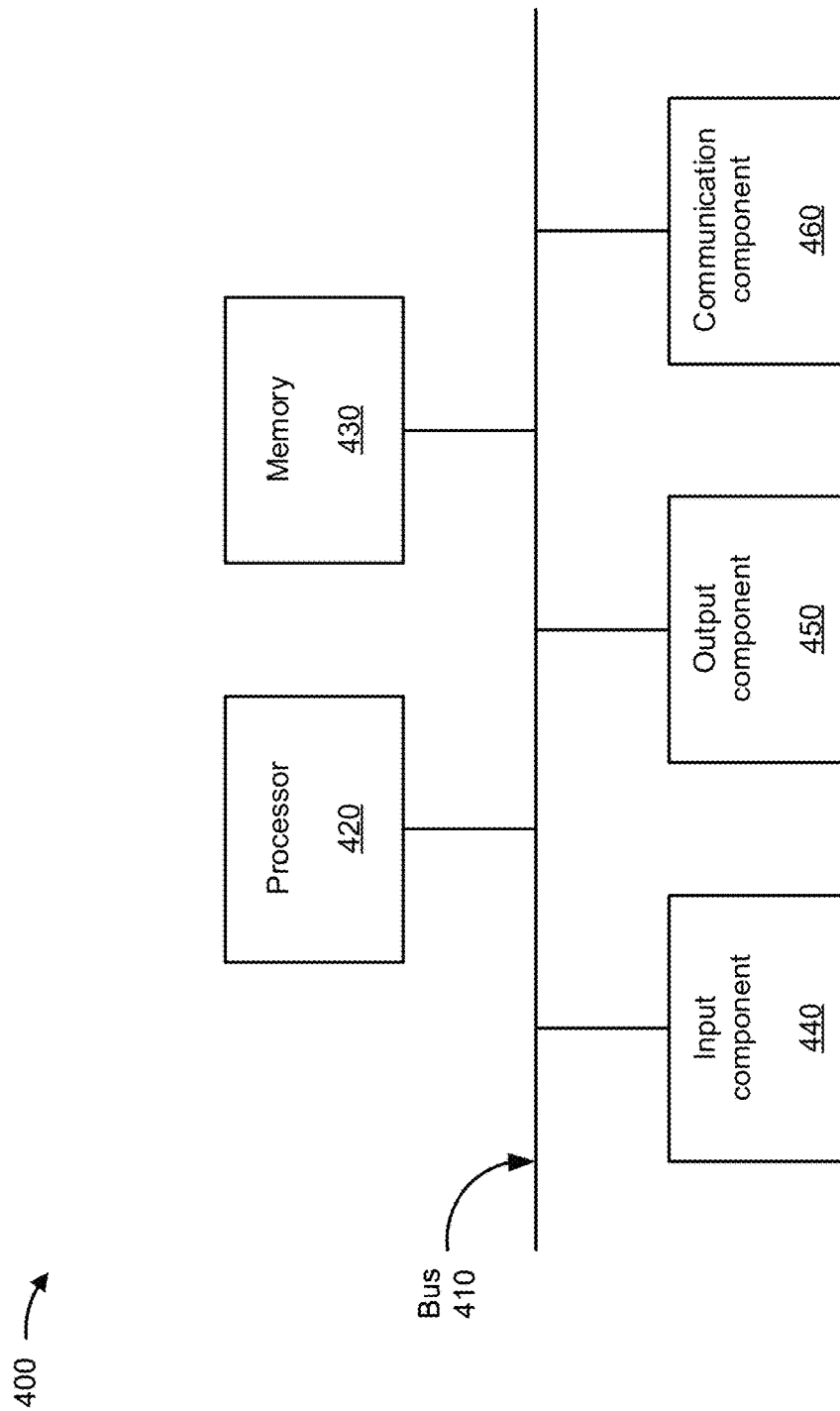
FIG. 4 is a diagram of example components of one or more devices of FIG. 3.

FIG. 4 is a diagram of example components of a device 400, which may correspond to the user device 105, the network device 110, the ECN system 115, and/or the QM system 120. In some implementations, the user device 105, the network device 110, the ECN system 115, and/or the QM system 120 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of the device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, and/or an actuator. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, and/or an antenna.

The device 400 may perform one or more processes described herein. For example, a non-transitory computer-readable medium (e.g., the memory 430) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
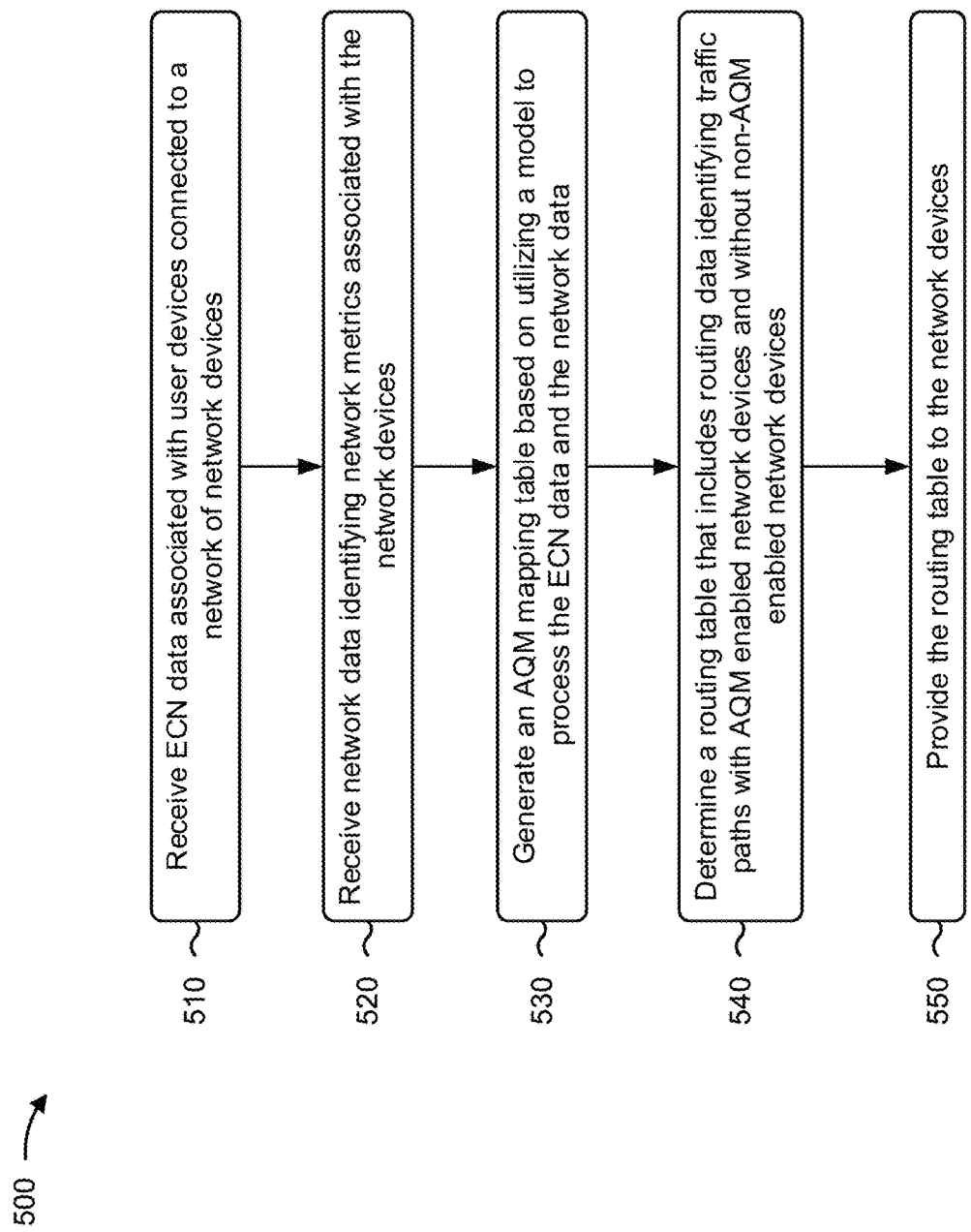
FIG. 5 is a flowchart of an example process for determining routing data based on ECNs and AQM enabled network devices.

FIG. 5 is a flowchart of an example process 500 for determining routing data based on ECNs and AQM enabled network devices. In some implementations, one or more process blocks of FIG. 5 may be performed by a device (e.g., the QM system 120). In some implementations, one or more process blocks of FIG. 5 may be performed by another device or a group of devices separate from or including the device, such as a network device (e.g., the network device 110) and/or an ECN system (e.g., the ECN system 115). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving ECN data associated with user devices connected to a network of network devices (block 510). For example, the device may receive ECN data associated with user devices connected to a network of network devices, as described above. In some implementations, the ECN data identifies explicit congestion associated with the user devices on a per flow basis. In some implementations, receiving the ECN data includes receiving the ECN data from the network devices, via an ECN system. In some implementations, the network is a heterogeneous network that includes one or more AQM enabled network devices and one or more not-AQM enabled network devices.

As further shown in FIG. 5, process 500 may include receiving network data identifying network metrics associated with the network devices (block 520). For example, the device may receive network data identifying network metrics associated with the network devices, as described above. In some implementations, the network data includes data identifying one or more of identifiers associated with the network devices, indications of whether each of the network devices are AQM enabled or are non-AQM enabled, indications of whether the network devices are associated with low latency communications, indications of whether the network devices are associated with enhanced mobile broadband, or service types associated with network traffic.

As further shown in FIG. 5, process 500 may include generating an AQM mapping table based on utilizing a model to process the explicit congestion notification data and the network data (block 530). For example, the device may generate an AQM mapping table based on utilizing a model to process the explicit congestion notification data and the network data, as described above. In some implementations, generating the AQM mapping table includes processing the ECN data and the network data, with a machine learning model, to generate the AQM mapping table. In some implementations, the AQM mapping table includes data identifying one or more of identifiers associated with the network devices, flowing types associated with the ECN data, transports and congestion associated with the ECN data, or indications of whether each of the network devices are AQM enabled or are non-AQM enabled.

In some implementations, generating the AQM mapping table includes mapping identifiers associated with the network devices and flow types associated with the ECN data, based on transports and congestion associated with the ECN data and based on whether each of the network devices are AQM enabled or are non-AQM enabled, to generate the AQM mapping table.

As further shown in FIG. 5, process 500 may include determining, based on the AQM mapping table and the network data, a routing table that includes routing data identifying traffic paths with AQM enabled network devices and without non-AQM enabled network devices, of the network devices (block 540). For example, the device may determine, based on the AQM mapping table and the network data, a routing table that includes routing data identifying traffic paths with AQM enabled network devices and without non-AQM enabled network devices, of the network devices, as described above. In some implementations, determining, based on the AQM mapping table and the network data, the routing table includes determining the routing table based on one or more of service types associated with network traffic identified in the network data, a quantity of AQM enabled network devices of the network devices, a quantity of non-AQM enabled network devices of the network devices, or network changes identified in the network data.

In some implementations, the routing table includes data identifying one or more of service types associated with network traffic, DSCP binary values associated with the service types, ECN binary values associated with the service types, or indications of whether each of the traffic paths includes multiple paths or a single path. In some implementations, the routing table causes the network devices to provide source-based MPLS routing, IPv6 routing, IPv4 routing, and/or the like. In some implementations, the routing table causes the network devices to provide segment routing for network traffic via the traffic paths.

In some implementations, determining, based on the AQM mapping table and the network data, the routing table includes mapping service types associated with network traffic, with DSCP binary values associated with the service types and with ECN binary values associated with the service types, to determine the routing table.

As further shown in FIG. 5, process 500 may include providing the routing table to the network devices (block 550). For example, the device may provide the routing table to the network devices, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, explicit congestion notification data associated with user devices connected to a network of network devices;
    receiving, by the device, network data identifying network metrics associated with the network devices, the network metrics indicating whether each of the network devices are active queue management (AQM) enabled or non-AQM enabled;
    generating, by the device, an AQM mapping table based on utilizing a model to process the explicit congestion notification data and the network data,
        wherein the AQM mapping table comprises identifiers of first one or more of the network devices with corresponding indications indicating that the first one or more network devices are AQM enabled and identifiers of second one or more of the network devices with corresponding indications indicating that the second one or more network devices are non-AQM enabled, based on the network metrics indicating whether each of the network devices are AQM enabled or non-AQM enabled;
    determining, by the device and based on the AQM mapping table and the network data, a routing table that includes routing data identifying traffic paths with AQM enabled network devices and without non-AQM enabled network devices, of the network devices; and providing, by the device, the routing table to the network devices.

2. The method of claim 1, wherein the explicit congestion notification data identifies explicit congestion associated with the user devices on a per flow basis.

3. The method of claim 1, wherein receiving the explicit congestion notification data comprises: receiving the explicit congestion notification data from some of the network devices, via an explicit congestion notification system.

4. The method of claim 1, wherein the network data further includes data identifying one or more of:

identifiers associated with the network devices, indications of whether the network devices are associated with low latency communications, indications of whether the network devices are associated with enhanced mobile broadband, or service types associated with network traffic.

5. The method of claim 1, wherein generating the AQM mapping table comprises:

processing the explicit congestion notification data and the network data, with a machine learning model, to generate the AQM mapping table.

6. The method of claim 1, wherein the AQM mapping table further includes data identifying one or more of:

identifiers associated with the network devices, flow types associated with the explicit congestion notification data, or transports and congestion associated with the explicit congestion notification data.

7. The method of claim 1, wherein determining, based on the AQM mapping table and the network data, the routing table comprises:

determining the routing table based on one or more of:

service types associated with network traffic identified in the network data, a quantity of AQM enabled network devices of the network devices, a quantity of non-AQM enabled network devices of the network devices, or network changes identified in the network data.

8. A device, comprising:

one or more processors configured to:

receive explicit congestion notification data associated with user devices connected to a network of network devices, wherein the explicit congestion notification data identifies explicit congestion associated with the user devices on a per flow basis;

receive network data identifying network metrics associated with the network devices, the network metrics indicating whether each of the network devices are active queue management (AQM) enabled or non-AQM enabled;

generate an AQM mapping table based on utilizing a model to process the explicit congestion notification data and the network data, wherein the AQM mapping table comprises identifiers of first one or more of the network devices with corresponding indications indicating that the first one or more network devices are AQM enabled and identifiers of second one or more of the network devices with corresponding indications indicating that the second one or more network devices are non-AQM enabled, based on the network metrics indicating whether each of the network devices are AQM enabled or non-AQM enabled;

determine, based on the AQM mapping table and the network data, a routing table that includes routing data identifying traffic paths with AQM enabled network devices and without non-AQM enabled network devices, of the network devices; and provide the routing table to the network devices.

9. The device of claim 8, wherein the routing table includes data identifying one or more of:

service types associated with network traffic, differentiated service code point binary values associated with the service types, explicit congestion notification binary values associated with the service types, or indications of whether each of the traffic paths includes multiple paths or a single path.

10. The device of claim 8, wherein the routing table causes the network devices to provide source-based multi-protocol label switching routing or Internet protocol version 6 routing.

11. The device of claim 8, wherein the routing table causes the network devices to provide segment routing for network traffic via the traffic paths.

12. The device of claim 8, wherein the one or more processors, to generate the AQM mapping table, are configured to:

map identifiers associated with the network devices and flow types associated with the explicit congestion notification data, based on transports and congestion associated with the explicit congestion notification data and based on whether each of the network devices are AQM enabled or are non-AQM enabled, to generate the AQM mapping table.

13. The device of claim 8, wherein the one or more processors, to determine, based on the AQM mapping table and the network data, the routing table, are configured to:

map service types associated with network traffic, with differentiated service code point binary values associated with the service types and with explicit congestion notification binary values associated with the service types, to determine the routing table.

14. The device of claim 8, wherein the network is a heterogeneous network that includes one or more AQM enabled network devices and one or more non-AQM enabled network devices.

15. A non-transitory computer-readable medium storing a set of instructions, the set of instructions comprising:

one or more instructions that, when executed by one or more processors of a device, cause the device to:

receive explicit congestion notification data associated with user devices connected to a network of network devices;

receive network data identifying network metrics associated with the network devices, the network metrics indicating whether each of the network devices are active queue management (AQM) enabled or non-AQM enabled;

generate AQM mapping table, wherein the AQM mapping table comprises identifiers of first one or more of the network devices with corresponding indications indicating that the first one or more network devices are AQM enabled and identifiers of second one or more of the network devices with corresponding indications indicating that the second one or more network devices are non-AQM enabled, based on the network metrics indicating whether each of the network devices are AQM enabled or non-AQM enabled;

determine, based on the AQM mapping table and the network data, a routing table that includes routing data identifying traffic paths with AQM enabled network devices and without non-AQM enabled network devices, of the network devices; and provide the routing table to the network devices.

16. The non-transitory computer-readable medium of claim 15, wherein the AQM mapping table further includes data identifying one or more of: identifiers associated with the network devices, flow types associated with the explicit congestion notification data, or transports and congestion associated with the explicit congestion notification data.

17. The non-transitory computer-readable medium of claim 15, wherein the one or more instructions, that cause the device to determine, based on the AQM mapping table and the network data, the routing table, cause the device to: determine the routing table based on one or more of:
   service types associated with network traffic identified in the network data, a quantity of AQM enabled network devices of the network devices, a quantity of non-AQM enabled network devices of the network devices, or network changes identified in the network data.

18. The non-transitory computer-readable medium of claim 15, wherein the routing table causes the network devices to provide source-based multiprotocol label switching routing or Internet protocol version 6 routing.

19. The non-transitory computer-readable medium of claim 15, wherein the one or more instructions, that cause the device to generate the AQM mapping table, cause the device to:
   map identifiers associated with the network devices and flow types associated with the explicit congestion notification data, based on transports and congestion associated with the explicit congestion notification data and based on whether each of the network devices are AQM enabled or are non-AQM enabled, to generate the AQM mapping table.

20. The non-transitory computer-readable medium of claim 15, wherein the one or more instructions, that cause the device to determine, based on the AQM mapping table and the network data, the routing table, cause the device to:
   map service types associated with network traffic, with differentiated service code point binary values associated with the service types and with explicit congestion notification binary values associated with the service types, to determine the routing table.

\* \* \* \* \*